United States Patent
Krishnamurthy

(10) Patent No.: US 12,041,443 B2
(45) Date of Patent: Jul. 16, 2024

(54) INTEGRITY FOR MOBILE NETWORK DATA STORAGE

(71) Applicant: Nokia Solutions and Networks Oy, Espoo (FI)

(72) Inventor: Sandeep Raman Krishnamurthy, Bangalore (IN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 119 days.

(21) Appl. No.: 17/192,000

(22) Filed: Mar. 4, 2021

(65) Prior Publication Data

US 2021/0282009 A1 Sep. 9, 2021

(30) Foreign Application Priority Data

Mar. 4, 2020 (EP) ..................... 20160838

(51) Int. Cl.
- *H04L 29/00* (2006.01)
- *H04W 12/0431* (2021.01)
- *H04W 12/0471* (2021.01)

(52) U.S. Cl.
CPC ... *H04W 12/0471* (2021.01); *H04W 12/0431* (2021.01)

(58) Field of Classification Search
CPC ............ H04W 12/0471; H04W 12/0431
USPC .......................................... 380/270
See application file for complete search history.

(56) References Cited

U.S. PATENT DOCUMENTS

2017/0075938 A1* 3/2017 Black ................ H04L 9/3239
2019/0372834 A1* 12/2019 Patil ................. H04L 9/3263

FOREIGN PATENT DOCUMENTS

| CN | 107317842 A | 11/2017 |
|----|-------------|---------|
| EP | 3525389 A1  | 8/2019  |

OTHER PUBLICATIONS

Mafakheri et al., "Blockchain-based Infrastructure Sharing in 5G Small Cell Networks", 14th International Conference on Network and Service Management (CNSM), Nov. 5-9, 2018, 5 pages.
"A Network Data Layer Concept for the Telco Industry", NGMN, Version : V1.0, Aug. 17, 2018, 14 pages.
Bihannic et al., "Network Slicing and Blockchain to Support the Transformation of Connectivity Services in the Manufacturing Industry", IEEE Software Defined Networks, Mar. 2018, 7 pages.
"How Blockchain Can Impact the Telecommunications Industry and Its Relevance to the C-suite", Blockchain Institute, Deloitte, 2016, 13 pages.

(Continued)

*Primary Examiner* — Jeffrey C Pwu
*Assistant Examiner* — Michael D Anderson
(74) *Attorney, Agent, or Firm* — Lippes Mathias LLP

(57) ABSTRACT

According to an example aspect of the present invention, there is provided method, comprising: generating or receiving a first hash on the basis of the mobile network data change by a source network function, providing the first hash and security credentials information of the source network function for validation by a set of validator entities, and in response to detecting validation of the first hash and the security credentials information, generating a first transaction for a first blockchain, the first transaction being indicative of the mobile network data change and comprising the first hash.

23 Claims, 3 Drawing Sheets

(56) References Cited

OTHER PUBLICATIONS

Dewey et al., "Blockchain and 5G-enabled Internet of Things (IoT) Will Redefine Supply Chains and Trade Finance", The Secured Lender, Jan./Feb. 2018, 4 pages.
Extended European Search Report received for corresponding European Patent Application No. 20160838.7, dated Aug. 11, 2020, 8 pages.

* cited by examiner

INTEGRITY FOR MOBILE NETWORK DATA STORAGE

FIELD

Various example embodiments relate to integrity control for mobile network data storage.

BACKGROUND

With the fast increase of various new devices being wirelessly connected and substantial data traffic growth, requirements for wireless networks are also changing. Upcoming generations of mobile communication systems, such as Fifth Generation (5G) communication systems, are expected to support applications such as virtual reality, augmented reality, reliable remote operation of machines, factory automation, network-assisted control of traffic and self-driving vehicles. Further requirements for future communication systems are caused by the increasing internetworking of physical devices such as appliances, vehicles, buildings, and other items that are embedded with electronics, software, sensors, actuators, and network connectivity that enable the devices to collect and exchange data.

Network flexibility enhancements support self-contained enterprise networks, installed and maintained by network operators while being managed by the enterprise. Network slicing allows provisioning a customized networks e.g. for particular users or enterprises. Instead of a single mobile operator proprietarily managing its mobile network and mobile network data, mobile network data may be stored by/for various other entities.

SUMMARY

Some aspects of the invention are defined by the features of the independent claims. Some example embodiments are defined in the dependent claims.

According to a first aspect, there is provided a method, comprising: generating or receiving a first hash on the basis of the mobile network data change by a source network function, providing the first hash and security credentials information of the source network function for validation by a set of validator entities, in response to detecting validation of the first hash and the security credentials information, generating a first transaction for a first blockchain, the first transaction being indicative of the mobile network data change and comprising the first hash.

According to a second aspect, there is provided an apparatus, comprising means for performing the method of the first aspect or any embodiment thereof.

There is also provided an apparatus comprising at least one processor, at least one memory including computer program code, the at least one memory and the computer program code being configured to, with the at least one processor, cause the apparatus at least to carry out features in accordance with the first aspect or any embodiment thereof.

According to still further aspects, there are provided a computer program and a computer-readable medium, or a non-transitory computer-readable medium, configured, when executed in a data processing apparatus, to carry out features in accordance with the first aspect or any embodiment thereof.

BRIEF DESCRIPTION OF THE DRAWINGS

Some example embodiments will now be described with reference to the accompanying drawings.

EMBODIMENTS

Figure 1:
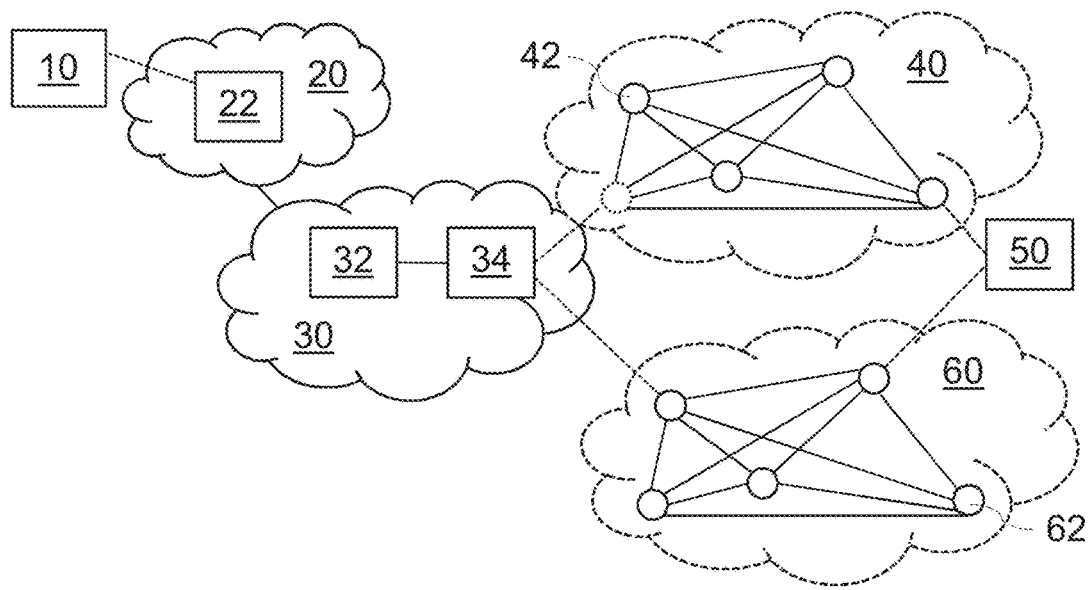
FIG. 1 illustrates an example communications system.

FIG. 1 illustrates a simplified example of a mobile communications system. The system comprises a mobile device (MD) 10, such as a user equipment (UE). Without limiting to Third Generation Partnership Project (3GPP) User Equipment, the term user equipment/UE is to be understood broadly to cover various mobile/wireless terminal devices, mobile stations and devices for user communication and/or machine type or IoT communication. In some embodiments, the MD 10 is a constrained UE device, lacking some capabilities over a conventional or fully-equipped UE.

The system comprises a mobile network, which may comprise an access network (AN) and a core network 30. The AN 20 may be a cellular or public land mobile network (PLMN) based access network, such as a 3GPP 5G (or another generation) (radio) access network. The mobile device 10 may be configured to access a network node 22, such as a NodeB, evolved NodeB (eNB), Next Generation (NG) NodeB (gNB), a base station, an access point, or other suitable wireless/radio access network device or system. The access network (and the node 22 thereof) is connected to further node(s) of the network 30, such as a Next Generation core network, Evolved Packet Core (EPC), or another type of core network/network management element.

The MD 10 may be configured to connect a non-public network (NPN). The NPN may comprise a cellular or non-cellular (NPN) access network with access network node(s), such as an access point (AP) of an IEEE 802.11 based network or other non-3GPP access network, without however limiting to these examples. In an embodiment, the access network 20 is a NPN access network, which may be a private company network, for example. The NPN may comprise an NPN core network, which may comprise a set of appropriate core network functions. The NPN may be a standalone NPN (SNPN), i.e. operated by an NPN operator and not relying on network functions provided by a PLMN, or a public network integrated NPN, i.e. a non-public network deployed with the support of a PLMN. Public network integrated NPNs can be enabled using network slicing.

The core network 30 may comprise various network functions (NFs) 32, 34. A network function in the present application may refer to an operational and/or physical entity, without limiting to 5G network functions. The network function may be a specific network node or element, or a specific function or set of functions carried out by one or more entities, such as virtual network elements or physical network nodes. Examples of such network functions include an access control or management function, mobility management or control function, session management or control function, interworking, data management or storage function, authentication function, data storage function, or a combination of one or more of these functions. In an embodiment, the NF 34 may be configured to manage mobile network data storage on the basis of mobile network data from another NF 32.

In some embodiments, the core network 30 is based on 3GPP 5G core network functions, some of which are illustrated below. In the 5G core network, user plane (UP) functions are separated from control plane (CP) functions. Access and Mobility Management Function (AMF) and Session Management Function (SMF) provide CP functions. The SMF controls one or more User Plane Functions (UPF) for handling user plane path of packet data unit (PDU) sessions for the UE. The AMF may comprise termination of radio access network CP N2 interface, registration management, connection management, reachability management, mobility management, access authentication, access authorization, Security Anchor Functionality (SEAF), Security Context Management (SCM), and support of N2 interface for non-3GPP access. Unified Data Management (UDM) is a network function storing subscriber and authentication data for the subscriber (represented by USIM) and may comprise support for generation of 3GPP authentication credentials, user identification handling, access authorization based on subscription data (e.g. roaming restrictions), serving network function registration, subscription management, without limiting to these functionalities.

The 5G Core advocates stateless architecture and proposes the storage of structured data in Unified Data Repository (UDR) and the unstructured data in the Unstructured Data Storage Function (UDSF). Various network functions can store and retrieve data into/from the UDSF and the UDR as necessary over the Nudsf and Nudrs interface, respectively. Structured data may refer to data for which the structure is defined in an associated (standard) specification, such as an appropriate 3GPP specification. Unstructured data may refer to data for which the structure is not defined in such specification.

With the introduction of 5G, more machine type communications or IoT devices connect to the mobile network. Additionally, unlike classical service provider networks, not all networks will be public, but there may be various types of private enterprise networks providing services for mobile users. Mobile network data may thus be stored by NFs from different vendors in the operator network and from multiple enterprises. This is especially true in case of network slicing where the network will be sliced to store and retrieve data from various third-party enterprises. There is a need for improvements for trustworthiness of mobile network data provided and stored by various entities.

There is now provided an improved solution, facilitating a blockchain based trust establishment system or fabric for mobile network data by various network functions. Blockchain is generally a decentralized and distributed ledger technology that uses algorithms and strong encryption to record digital transactions or data in a transparent, secure, and anonymous way. Application of blockchain technology enables a way to track the unique history of transactions by individual nodes in the network. Blockchain transactions secured by strong cryptography are exchanged and validated in order to reach consensus for resource ownership.

As further illustrated in FIG. 1, a blockchain (BC) based platform or network 40 may be established by a set of nodes 42. The BC network may refer to a set of nodes maintaining a BC, wherein the nodes may store a local blockchain database. The BC network 40 and the BC may be a private, permissioned BC, in which access may be restricted for nodes authorized by network owner and managed by a certification authority (CA). Certain nodes of the network 40 may be authorized to operate as validators for BC transactions. The BC network 40 may be implemented by network nodes of one or more mobile networks, such as nodes of the CN 30. For example, a network node configured to implement the network function 34, is configured to operate as a BC node and part of the BC network 40. In another embodiment, the network function 34 is connected to a network node configured to operate as a BC node.

There may be BC nodes implemented or connected by network nodes 50 of other (mobile and/or non-mobile) networks. FIG. 1 also illustrates another (second) distributed system or blockchain network 60 comprising a set of nodes 62 maintaining another (second) BC. It is to be noted that a wide variety of mobile or non-mobile devices may be configured to operate as a BC node 42, 62, such as a network node or element, a server, a wireless device, a user device, a machine-type communications (MTC) device, or other type of computing device.

Figure 2:
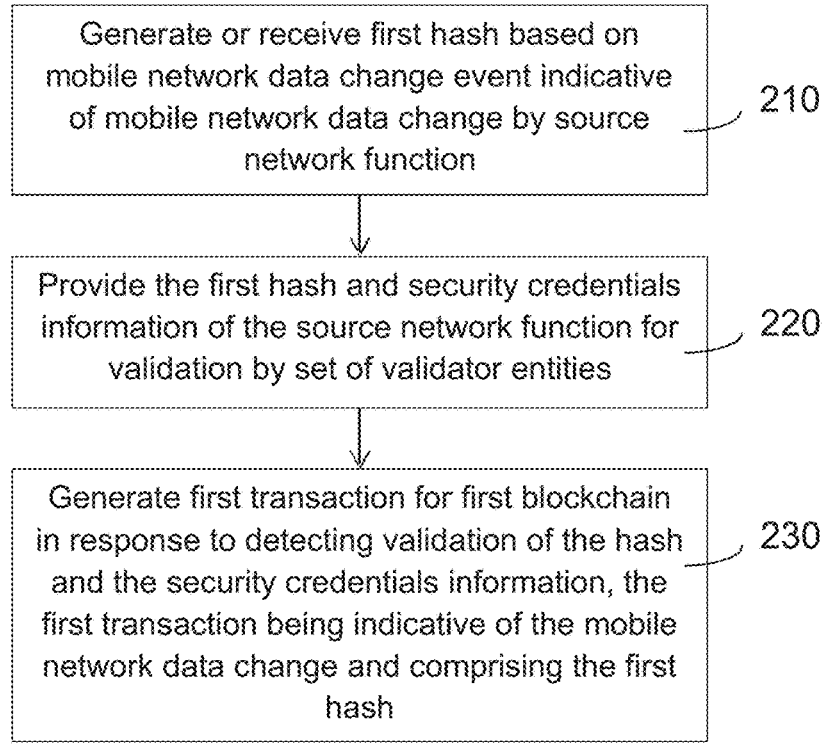
FIGS. 2 and 3 illustrate methods in accordance with at least some example embodiments.

FIG. 2 illustrates a method for mobile network data integrity preservation according to some embodiments. The method may be applied by an apparatus, such as a network element or node, a network function, or a controller or module thereof, e.g. configured to perform the network function 34.

A first hash is generated or received 210 on the basis of mobile network data change by a source network function.

The first hash and security credentials information of the source network function are provided 220 for validation by a set of validator entities.

In response to detecting validation of the first hash and the security credentials information, a first transaction is generated 230 for a first blockchain. The first transaction is indicative of the mobile network data change and comprises the first hash. The apparatus performing the method may further cause provision of the first transaction to the first blockchain in/after block 230. The apparatus may thus send or broadcast the first transaction for validation in a (first) BC network, e.g. the BC network 40.

Upon validation of the transaction by a set of (one or more) validating entities, which may also be referred e.g. to as validating nodes or validators, a new block comprising the transaction may be added to the first blockchain, such as the BC maintained in the network 40 of FIG. 1. The data written in the first BC becomes non-repudiable as the BC grows. It is to be noted that the first transaction may comprise records of one or more mobile network data changes or change events. Such events may be accumulated for a pre-configured period of time and/or number of events, for example, before a new block comprising data on the accumulated events is generate to the first BC.

In an example embodiment, the method may comprise further block before block 210 of detecting an event indicative of mobile network data change by a source network function, and then generating the first hash in block 220 on the basis of the mobile network data change. In another example embodiment, the apparatus performing the method receives the first hash from the source network function or another network function or node that has detected the mobile network data change event.

A network function in the present application may refer to an operational and/or physical entity, without limiting e.g. to 5G network functions. The provision (of information, e.g. the first hash) may refer to sending or causing sending of the associated information by the apparatus carrying out the method of FIG. 2 to other functional entity(-ies) and/or physical device(s), such as the nodes 42. The information may be transmitted by a request (responded by the receiving device, as unicast, multicast or broadcast type of transmission(s). Block 220 may thus comprise causing validation of the first hash and the security credentials, e.g. by transmitting an associated control signal comprising the first hash and the security credentials to all or selected ones of configured validator entities. Depending on the chosen implementation, a validation entity may or may not be configured to operate as a node of the first BC. The validation may be detected based on received responses from the validator entities (not illustrated as separate block in FIG. 2). For example, a predetermined number of responses indicating validation may be required. It is also to be appreciated that the validation of the first hash and security credentials may be arranged together or separate from each other. For example, there may be separate transmission/reception blocks for first hash validation event and security credentials validation event.

Mobile network data change refers herein generally to any type of change to data stored in mobile network data storage, such as by addition, removal, or update. The mobile network data may be data on users and/or devices that are subscribed to, connected to and/or using the services of the mobile network, such as 3GPP 5G subscriber data stored by UDR and/or UDSF, or other type of data stored by a mobile network function. It will be appreciated that there may be further stages/blocks in the method, some of which are further illustrated below.

A blockchain transaction, comprising the first transaction of block 230, may be a public or private transaction. A blockchain transaction record comprises the relevant transaction information, and a hash pointer to previous block of the chain. The record may comprise also further information element(s), such as a timestamp. Each block in the chain typically contains a hash pointer as a link to a previous block, a timestamp and transaction data.

A blockchain transaction may comprise an identifier of a new owner, that is the recipient, of the resource, together with a cryptographic signature of the previous owner, that is the sender, such that malicious attackers cannot re-assign resources they do not own.

Each block of data has a unique hash which may be generated on the basis of the mobile network data change (after the validation). The hash serves also as an address or link to the next block. This chain of blocks may be copied to all nodes of the network, thus forming a distributed (blockchain) ledger of mobile network data changes.

In some embodiments, a writer entity, such as a network node configured to perform the method of FIG. 2 and/or implement the UDR and/or UDSF, provides signed blockchain transactions to the blockchain directly or via other units, such as another node. To establish a next block, the transactions are broadcast into the blockchain network. Broadcasting here refers to a dissemination method suitable for the context, which will cause the transactions to be communicated to the nodes of the network in general. Reaching each and every node with each and every transaction is not in all implementations necessary.

A node establishing the next block may be known as a miner node. A miner node may compile a set of transactions, which it receives from the broadcasts, for the next block, and search for a proof-of-work code that covers all the transactions in the set of transactions for the next block. For example, the proof-of-work code may be a numerical value, with which the contents of the next block, that is, the set of transactions, hashes to a value that is less than a threshold. Once a miner discovers the proof-of-work, it can publish the block, which other nodes of the system will then add to the block chain as the new most recent established block.

In case the miner node discovers a proof-or-work based on an incomplete set of transactions, for example if some transactions did not reach the miner node, other nodes in the network will not accept the block into the blockchain, and it will be excluded from a consensus version of the blockchain in the system.

Although discussed above in terms of proof-of-work, another type of consensus system may be applied for the validation. In some embodiments, a proof-of-stake is used instead of, or additionally to, a proof-of-work. In a proof-of-stake based system, a new block may be accepted once a predetermined fraction of resources are proven as owned by nodes ready to accept the new block version. If the block's validation is successful, the block gets appended and the validators get a reward which is proportionate to the bets they placed. Other example consensus mechanisms include proof-of-activity (PoA), proof-of-burn (PoB), proof-of-capacity (PoC), and proof-of-elapsed time (PoET).

The first transaction may be stored in the first blockchain in response to validation of the first transaction. This may be an additional step after block 230. However, in another example embodiment, the validation triggered by block 220 and performed by the validator entities, which may operate (also) as blockchain miner nodes, comprises appropriate validation operations required for storing the transaction to the first blockchain. The generation of the first transaction in block 230 may thus refer to (locally) writing or adding the first transaction as a new block of the blockchain being maintained. Each node may have their own copy of the ledger which is in some embodiments permission-controlled, so participants see only appropriate transactions.

There are various options on how the first transaction may be indicative of the mobile network data change. For example, there may be an explicit indication of the mobile network in the transaction data, or the mobile network data change may be indicated implicitly by the first hash, for example. The first transaction may comprise further information, such as a digital signature of the source network entity associated with the hash and/or timestamp indicative of timing information associated with the transaction.

The validation of the security credentials information may comprise validating (which may refer also to verifying) at least one security parameter from the source network element. For example, an authentication parameter or token, an authorization parameter or token, and/or an integrity protection parameter is verified by an associated verification method. In some example embodiments, the validation comprises verification of a digital signature. A digital signature generated by a secret key of the source network function may be validated based on a public key of the source network function. However, it will be appreciated that various other types of security credentials may be applied. The validator entity may be configured to validate two or more types of security credentials. A validation method may be selected on the basis of identifying the type of received security credentials information. In an example embodiment, the validator entity may perform the first hash validation by recalculating the first hash. The validator entity may thus access the mobile network storage or otherwise obtain the input for calculating the first hash.

At least blocks 210 and 220 may be repeated each time there is a change to protected mobile network data. In some embodiments, the first hash of the data change is generated of the mobile network data (record) as after the change. However, it is to be appreciated that there are various options for configuring the generation of the first hash, e.g. further on the basis of the preceding data (as before the change) or only some preconfigured portion of the mobile network data. The first blockchain may be repeatedly updated by subsequent hashes, each being associated with a change event to the mobile network data.

The mobile network change event may be detected or the first hash received by a writer entity on the basis of a request to update the first blockchain from the source network function initiating or performing the mobile network data change. However, there are also other options. In another example, the apparatus performing the method itself monitors for changes in the mobile network storage or database, or the change event detection and first hash generation is based on an indication of the change detected by another monitoring entity. Thus, no specific request or blockchain related activities are not required for the mobile network data storage.

The writer entity may further cause provision of the first transaction to the first blockchain in/after block 230. The term writer entity refers generally to a type or role of a network function or node, being configured to coordinate and initiate actions for updating the first blockchain in response to the mobile network data change.

There may be further roles in the system, such as the role of validator entity by network functions or nodes performing the validation in response to block 220. The validator entities may comprise one or more mobile network nodes or network functions, such as 5G mobile core network function(s). It is to be noted that such validating nodes may comprise at least some of the validator entities in of block 220 or completely or partially different nodes may validate the blockchain transaction in response to block 230. The system may further comprise observer(s), which may be independent nodes that can be installed by interested parties to ensure that the operations on the Blockchain maintained in the BC network 40, 60 are trustworthy. For example, node 42 and/or network node 50 may be configured to operate as an observer for the first BC.

Integrity of the stored mobile network data record(s) (after the change event) may be validated or verified on the basis of the hash(es) stored in the first BC. Thus, a hash generated on the basis of the mobile network data is compared to hashes, such as the first hash, stored in the BC. The integrity may be verified repetitively by the entity performing the method of FIG. 2 or another observing entity. The discrepancy is detected on the basis of output of the integrity verification.

Figure 3:
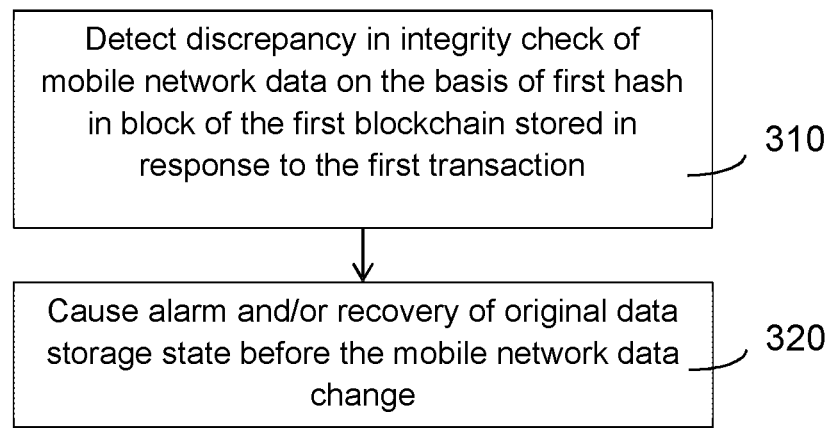

An integrity check of mobile network data stored in one more or mobile network databases or storages, such as the UDR and/or UDSF, may be arranged on the basis of hash(es) of mobile network data changes stored in the first blockchain. With reference to FIG. 3, a method according to an embodiment for such integrity check comprises detecting 310 a discrepancy in integrity check of mobile network data on the basis of the first hash in a block of the first blockchain stored in response to the first transaction (i.e. after the block comprising the first hash has been added in the first BC on the basis of the first transaction). The discrepancy may be detected if a hash generated of the mobile network data in the storage, i.e. indicative of the current mobile network data state, does not match with the (associated) first hash stored in the first blockchain.

An alarm and/or recovery of original data storage state before the data mobile network data change is caused in response to detecting the discrepancy. Thus, an entity performing the method of FIG. 3 and the triggering of block 320 may directly initiate the alarm and/or the preceding data reinstation, or indicate the discrepancy to a network function initiating the alarm and/or the preceding data reinstation, such as a network node managing the UDR or the UDSF, or another network management node. A backup of mobile network data record(s) or storage may be maintained in the system, from which the preceding data may be recovered. A periodic reconciliation operation to revalidate integrity of the current mobile network data may thus be performed for telecom operator's mobile network by applying at least some of the features illustrated in connection with FIG. 3.

A second transaction may be generated for a second blockchain, such as a BC stored in a second BC network 60 illustrated in FIG. 1. A second transaction may be generated on the basis of the first transaction. The NF 34 and/or node 50 may be nodes of the second BC network 60, or otherwise able to connect or provide such information for the second BC network 60. The second blockchain may be public, so that access to the network 60 is not restricted. The second transaction comprises a (second) hash based on hashes in at least one block of the first blockchain. The hashes used as input comprise at least the first hash stored in the first blockchain. A Merkle root can be formed of the hashes in the public blockchain, which is highly incorruptible. In a further example embodiment, the second hash is calculated based on all hashes in the first blockchain. As mentioned, in an example embodiment the first BC is private BC and the second BC is public BC. This enables to have speed and cost benefits of the private BC and still the high integrity of the public BC. An observer, e.g. the node 50 or 62, can e.g. periodically check for tampering with the public BC stored in the network 60.

The presently disclosed features facilitate in ensuring integrity of mobile network data stored within a telecom operator's network. Access to modify mobile network data may be provided to various (even untrusted) parties, such as vendors and enterprises. Unintended mobile network data changes may be detected and recovered in a straightforward manner. Liability protection is enabled for telecom operators hosting sensitive data from multiple enterprises or vendors.

Some further example embodiments are now illustrated, with further references to 3GPP 5G system, without however limiting the disclosed features to such system. In some embodiments for 3GPP 5G systems, the mobile network data change is a change to data stored in the UDR or the UDSF. However, it is to be appreciated that these are just examples, and presently disclosed features may be applied for other network functions or mobile network data storages in 3GPP systems or other systems.

Figure 4:
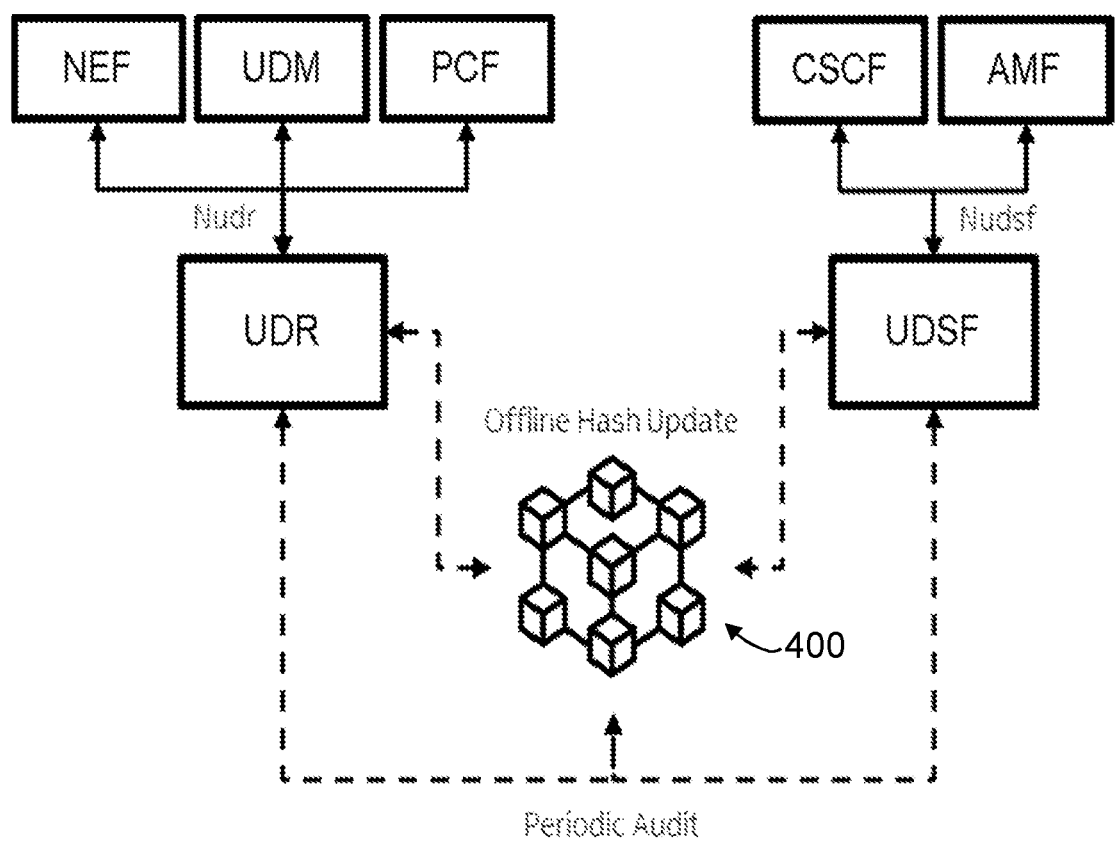
FIG. 4 illustrates an example embodiment for a 3GPP 5G based system.

FIG. 4 illustrates example architecture for a 3GPP 5G based system. The UDR may be connected to the Network Exposure Function (NEF), UDM, and policy control function (PCF) via Nudr interface. The UDSF may be connected to call session control function (CSCF) and AMF via Nudsf interface.

Examples of data that may be stored in the UDR include subscription data and policy data by UDM and PCF, structured data for exposure, and application data (such as Packet Flow Descriptions (PFDs) for application detection) by NEF. For example, a globally unique 5G Subscription Permanent Identifier (SUPI) shall be allocated to each subscriber in the 5G System and stored in the UDR. There can be multiple UDRs deployed in the network, each of which can accommodate different data sets or subsets, and/or serve different sets of NFs. Each NF Service Consumer, such as UDM, PCF, or NEF, accessing the UDR, via Nudr, may add, modify, update or delete only the data it is authorized to change.

5G System architecture allows an NF to store and retrieve its unstructured data into/from a UDSF (e.g. context for registered UE(s) by AMF). The UDSF is an optional function and belongs to the same PLMN where the network function is located. CP NFs may share a UDSF for storing their respective unstructured data or may each have their own UDSF (e.g. a UDSF may be located close to the respective NF).

On the basis of applying the method of FIG. 2, transactions indicative of the mobile network data changes to the UDR and/or UDSF may be generated and blocks added to (the first) blockchain 400. The first hash may be generated of a record or a set of records in the UDR and/or UDSF, for example. In an example embodiment, a NF, such as the UDM, NEF, or AMF, connected to the UDR or UDSF is operating as the source network function. In another example, a function of or connected to the storage UDR and/or UDSF operates as the source network function or is configured to perform the method of FIG. 2. NF(s), such as one or more of the NFs illustrated in FIG. 4, other core network NFs, or may be configured to operate as the writer entity and perform the method of FIG. 2 or as a validator entity.

By applying presently disclosed features, it is possible e.g. an enterprise or vendor to independently verify the integrity of the data which is stored in the UDR and/or UDSF (or another mobile network data storage). Occurrence of unwanted changes to the data can be automatically recovered upon a (e.g. periodic) integrity check, and reloaded from a backup if the data appears to be tampered.

This will enhance trust in mobile telecom networks where there may be more and more untrusted parties co-existing on shared infrastructure and make the data independently auditable. This can be performed without compromising performance of the UDR or UDSF, when the present features are applied as offline procedure e.g. periodically, not directly in the call processing path. The presently disclosed features are expected to provide particular advantages in cases where sensitive IoT data is stored in the operator network and the integrity and correctness of the data needs to be ensured to prevent potentially catastrophic failures.

It is to be noted that at least some of the network functions or nodes illustrated above, such as mobile network data changing network functions (e.g. UDM, AMF) and/or network function performing the method of FIG. 2 may be shared between two physically separate devices forming one operational entity. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to the software containers on a single system. For example, instances of the 3GPP network functions can be instantiated as virtual functions in network function virtualization architecture (NFV), which may be implemented on a set of data center servers.

An electronic device comprising electronic circuitries may be an apparatus for realizing at least some embodiments of the present invention. The apparatus may be or may be comprised in a computer, a server device, a PLMN node/element, or any other type of apparatus provided with appropriate communication and processing capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 5:
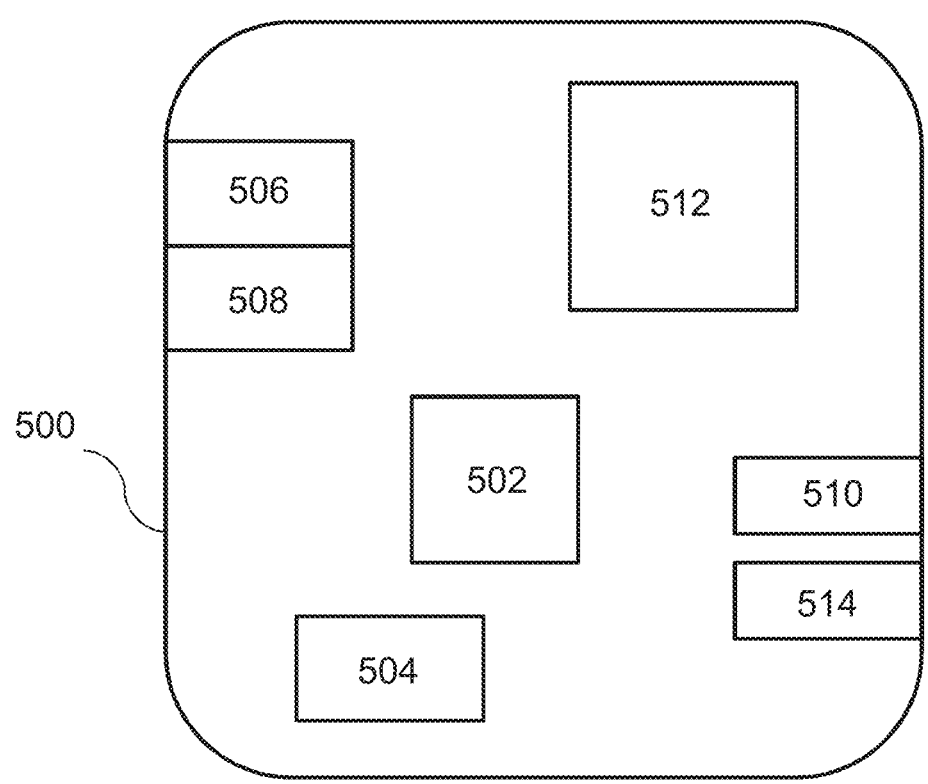
FIG. 5 illustrates an example apparatus capable of supporting at least some embodiments.

FIG. 5 illustrates an example apparatus capable of supporting at least some embodiments. Illustrated is a device 500, which may comprise a communications device configured to perform the network function 34, for example. The device may include one or more controllers configured to perform operations in accordance with at least some of the embodiments illustrated above, such as some or more of the features illustrated above in connection with FIGS. 2 to 4. The device may be configured to operate as the apparatus configured to carry out the method of FIG. 2.

Comprised in the device 500 is a processor 502, which may comprise, for example, a single- or multi-core processor wherein a single-core processor comprises one processing core and a multi-core processor comprises more than one processing core. The processor 502 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 500 may comprise memory 504. The memory may comprise random-access memory and/or permanent memory. The memory may comprise at least one RAM chip. The memory may comprise solid-state, magnetic, optical and/or holographic memory, for example. The memory may be at least in part comprised in the processor 502. The memory 504 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/ or its at least one processing core may be considered to be configured to perform said certain actions. The memory may be at least in part comprised in the processor. The memory may be at least in part external to the device 500 but accessible to the device. For example, input parameters and control parameters affecting operations related to above-illustrated blockchain operations may be stored in one or more portions of the memory and used to control operation of the apparatus.

The device 500 may comprise a transmitter 506. The device may comprise a receiver 508. The transmitter and the receiver may be configured to transmit and receive, respectively, information in accordance with at least one cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 3GPP new radio access technology (N-RAT), IS-95, wireless local area network, WLAN, and/or Ethernet standards, for example. The device 500 may comprise a further transceiver 510, such as near-field communication, NFC, transceiver.

The device 500 may comprise user interface, UI, 512. The UI may comprise at least one of a display, a keyboard, a touchscreen, a speaker and a microphone. A user may be able to operate the device via the UI, for example to view and manage data, such as the mobile network data, stored in in the memory 504 or on another device accessible via the transmitter 506 and the receiver 508, detect an alarm or another condition of the device or connected system (e.g. the alarm of block 320), and/or to configure parameters of the device, e.g. affecting some of the above-illustrated features.

The device 500 may comprise or be arranged to receive a removable (memory) module 514. The module may comprise, for example, a removable memory module or a cryptographic module installable in the device 500. For example, the module 514 may comprise cryptographic information for authentication and/or encryption of communicated information.

The processor 502 may be furnished with a transmitter arranged to output information from the processor, via electrical leads internal to the device 500, to other devices comprised in the device. Such a transmitter may comprise a serial bus transmitter arranged to, for example, output information via at least one electrical lead to memory 504 for storage therein. Alternatively to a serial bus, the transmitter may comprise a parallel bus transmitter. Likewise the processor may comprise a receiver arranged to receive information in the processor, via electrical leads internal to the device 500, from other devices comprised in the device 500. Such a receiver may comprise a serial bus receiver arranged to, for example, receive information via at least one electrical lead from the receiver 508 for processing in the processor. Alternatively to a serial bus, the receiver may comprise a parallel bus receiver.

The device 500 may comprise further devices not illustrated in FIG. 5. For example, the device may comprise an environment sensor or a fingerprint sensor arranged to authenticate, at least in part, a user of the device. In some embodiments, the device lacks at least one device described above. For example, some devices may lack the further transceiver 510, a display/UI 512, and/or the user identity module 514.

The processor 502, the memory 504, the transmitter 506, the receiver 508, the NFC transceiver 510, the UI 512 and/or the module 514 may be interconnected by electrical leads internal to the device 500 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one example embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising
at least one processor; and
at least one memory including computer program code;
the at least one memory and the computer program code configured to, with the at least one processor, cause the apparatus at least to:
generate or receive a first hash on the basis of mobile network data change by a source network function, provide the first hash and security credentials information of the source network function for validation by a set of validator entities, and in response to detecting validation of the first hash and the security credentials information, generate a first transaction for a first blockchain, the first transaction being indicative of the mobile network data change and comprising the first hash, and generate a second transaction for a second blockchain, the second transaction comprising a second hash based on hashes in at least one block of the first blockchain and comprising the first hash.

2. The apparatus of claim 1, wherein the at least one processor and the at least one memory including the computer program code are further configured to cause the apparatus to receive the first hash by a writer entity by a request to update the blockchain from the source network function initiating or performing the mobile network data change.

3. The apparatus of claim 1, wherein the first blockchain is a private blockchain and second blockchain is a public blockchain.

4. The apparatus of claim 1, wherein the first transaction further comprises a digital signature of the source network entity associated with the first hash.

5. The apparatus of claim 1, wherein the at least one processor and the at least one memory including the computer program code are further configured to cause the apparatus to:

detect a discrepancy of mobile network data stored in a mobile network database on the basis of the first hash in a block stored in the first blockchain on the basis of the first transaction, and cause an alarm and/or recovery of original data storage state before the data mobile network data change in response to detecting the discrepancy.

6. The apparatus of claim 5, wherein verification of integrity of hashes stored in the first blockchain is configured to be performed repetitively by the apparatus or another observing entity and the apparatus is configured to detect the discrepancy on the basis of output of the integrity verification.

7. The apparatus of claim 1, wherein the validator entities comprise one or more mobile core network nodes or network functions.

8. The apparatus of claim 1, wherein the mobile network data change is a change to data stored in a unified data repository or an unstructured data storage function of a mobile network.

9. A method for mobile network integrity preservation by a network node, comprising:

generating or receiving a first hash on the basis of mobile network data change by a source network function, providing the first hash and security credentials information of the source network function for validation by a set of validator entities, in response to detecting validation of the first hash and the security credentials information, generating a first transaction for a first blockchain, the first transaction being indicative of the mobile network data change and comprising the first hash, and generating a second transaction for a second blockchain, the second transaction comprising a second hash based on hashes in at least one block of the first blockchain and comprising the first hash.

10. The method of claim 9, wherein the first hash is received by a writer entity in a request to update the blockchain from the source network function initiating or performing the mobile network data change.

11. The method of claim 9, further comprising:

detecting a discrepancy in the first blockchain after a block comprising the first hash has been added on the basis of the first transaction, and causing an alarm and/or recovery of original data storage state before the data mobile network data change in response to detecting the discrepancy.

12. A non-transitory computer readable medium comprising program instructions for causing an apparatus to perform at least the following:

generating or receiving a first hash on the basis of mobile network data change by a source network function, providing the first hash and security credentials information of the source network function for validation by a set of validator entities, in response to detecting validation of the first hash and the security credentials information, generating a first transaction for a first blockchain, the first transaction being indicative of the mobile network data change and comprising the first hash, and generating a second transaction for a second blockchain, the second transaction comprising a second hash based on hashes in at least one block of the first blockchain and comprising the first hash.

13. The non-transitory computer readable medium of claim 12, wherein the first hash is received by a writer entity in a request to update the blockchain from the source network function initiating or performing the mobile network data change.

14. The non-transitory computer readable medium of claim 12, further comprising:

detecting a discrepancy in the first blockchain after a block comprising the first hash has been added on the basis of the first transaction, and causing an alarm and/or recovery of original data storage state before the data mobile network data change in response to detecting the discrepancy.

15. The apparatus of claim 1, wherein the security credentials comprise two or more types.

16. The apparatus of claim 1, wherein the validation is based on identifying a type of security credentials.

17. The method of claim 9, wherein the security credentials comprise two or more types.

18. The method of claim 9, wherein the validation is based on identifying a type of security credentials.

19. The non-transitory computer readable medium of claim 12, wherein the security credentials comprise two or more types.

20. The non-transitory computer readable medium of claim 12, wherein the validation is based on identifying a type of security credentials.

21. The apparatus of claim 1 wherein the second blockchain is in a second blockchain network.

22. The method of claim 9 wherein the second blockchain is in a second blockchain network.

23. The non-transitory computer readable medium of claim 12 wherein the second blockchain is in a second blockchain network.

* * * * *